March 17, 1925.                                                                   1,529,980
J. WILLISON
SLACK ADJUSTER FOR CONNECTING LINKS FOR CAR COUPLERS
Filed Feb. 18, 1922                       2 Sheets-Sheet 1
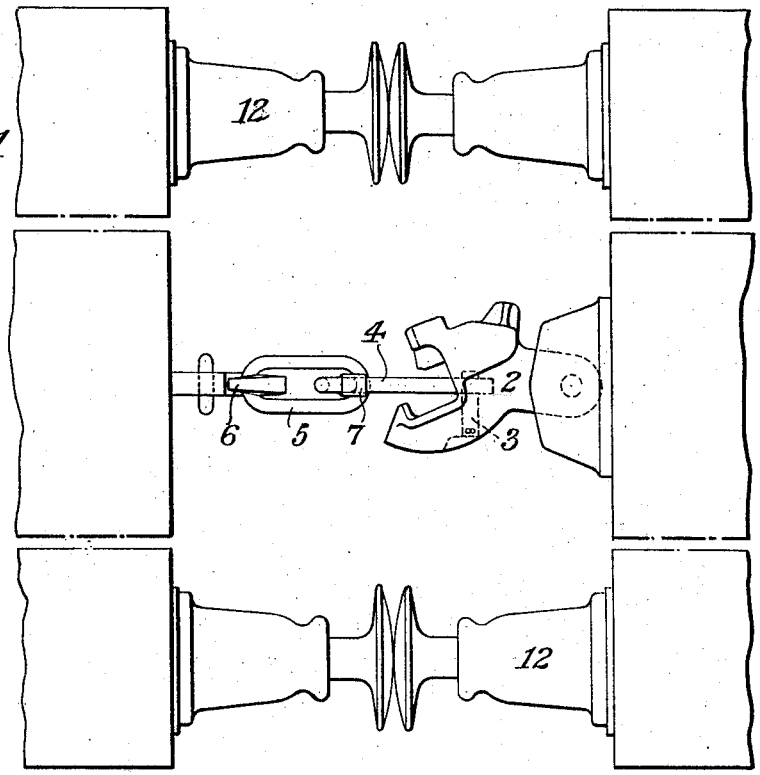
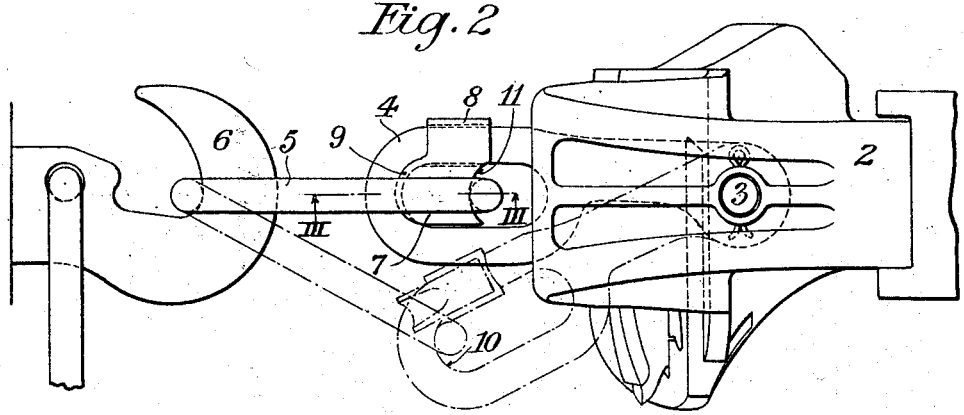
Inventor
John Willison
By his Attorney
Clarence D Kerr March 17, 1925. 1,529,980
J. WILLISON
SLACK ADJUSTER FOR CONNECTING LINKS FOR CAR COUPLERS.
Filed Feb. 18, 1922 2 Sheets-Sheet 2

Inventor
John Willison
By his Attorney
Clarence D. Kerr

Patented Mar. 17, 1925.

1,529,980

UNITED STATES PATENT OFFICE.

JOHN WILLISON, OF CLEVELAND, OHIO, ASSIGNOR, BY MESNE ASSIGNMENTS, TO NATIONAL MALLEABLE AND STEEL CASTINGS COMPANY, OF CLEVELAND, OHIO, A CORPORATION OF OHIO.

SLACK ADJUSTER FOR CONNECTING LINKS FOR CAR COUPLERS.

Application filed February 18, 1922. Serial No. 537,380.

*To all whom it may concern:*

Be it known that I, JOHN WILLISON, a subject of the King of Great Britain, and a resident of Cleveland, Cuyahoga County, Ohio, have invented new and useful Improvements in Slack Adjusters for Connecting Links for Car Couplers, of which the following is a specification, reference being had to the accompanying drawings, in which—

Figure 3:
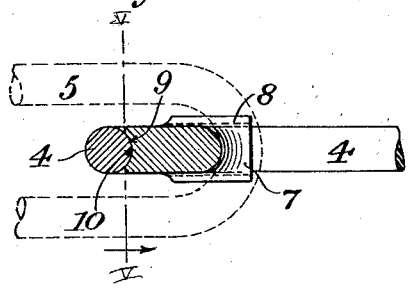
Figure 4:
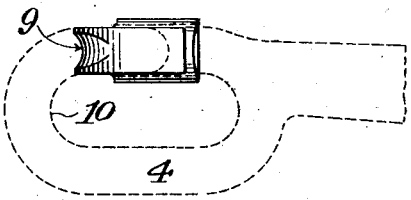
Figure 5:
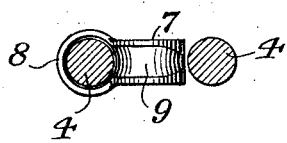
Figure 6:
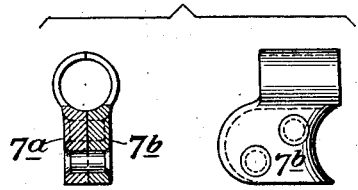
Figure 7:
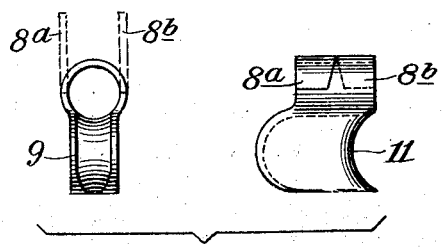

Fig. 1 is a plan of coupling mechanism embodying my improvements coupling together two railway cars; Fig. 2 is an elevation of an automatic coupler and a hook coupler secured together by connecting links equipped with my improved slack adjuster; Fig. 3 is a section on line III—III of Fig. 2; Fig. 4 is a detail showing the mounting of the slack adjuster on the link; Fig. 5 is a section on line V—V of Fig. 3; Figs. 6 and 7 show in section and elevation modified forms of adjusters respectively.

My invention relates to slack adjusters for links used particularly for connecting a draw hook coupler with any other type of coupler. The slack adjuster of my invention is applied to a pair of links depending from a coupler and comprises an attachment for one of the links which can be moved into position between the links and thereby take up the slack between the links. My invention also consists in the various features which I shall hereinafter describe and claim.

Referring to the drawings, 2 indicates a coupler of any approved type but which I have shown as of the type illustrated in my Letters Patent No. 1,201,665, dated October 17, 1916. Attached to the coupler by any suitable means, as the pin 3, is a link 4, from which depends a second link 5 intended to engage a hook coupling 6. Preferably attached to the link 4 is a slack adjuster 7 which is carried by one side of one of the links, preferably by the link 4. The slack adjuster may be secured to the link in a variety of ways. For instance, as is shown in Figs. 1, 2, 3, 4 and 5, the slack adjuster has a sleeve 8 which may be slipped over the link before the ends of the link are forged together; or in Fig. 6, in which the slack adjuster is made of two parts, $7^a$ and $7^b$, riveted together; or in Fig. 7, in which the securing portion consists in two upstanding projections $8^a$ and $8^b$, which are bent about the side of the link to form a sleeve when the slack adjuster is applied to the link. One end of the slack adjuster has a groove 9 into which fits the inner curved face 10 of the end of the link to prevent the adjuster from being twisted sideways under draft, and the other end has a shallow recess 11 which permits a free bearing of the link 5 on the adjuster 7 when under draft.

On railroads which are equipped partially with automatic couplers and partially with hook couplings, it is customary to carry links depending from the automatic couplers for use in coupling with cars having hook couplings, and in such cases the cars usually have buffers 12, as is shown in Fig. 1, to hold the cars a predetermined distance apart. In utilizing my invention with cars so equipped the end link 5 carried by the coupler 2 is slipped over the hook 6, in which case the links 4 and 5 droop down in the dotted line position shown in Fig. 2, which is the usual position of the links in coupling where no slack adjuster is employed. The links are then raised to a substantially horizontal position and the slack adjuster turned into place, so that it fills the space between the two links, as is shown in full lines in Fig. 2. When in this position it shortens the overall length of the two links and eliminates all but a very small amount of the slack which would otherwise be present due to the slack required for passing the link over the hook.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In transitional coupling mechanism for coupling an automatic car coupler and a coupler of a different type, a plurality of links, one of which is attached to one of the couplers and the other of which engages the other of said couplers, a slack adjuster permanently attached to one of said links and arranged to be interposed between the interlinked ends of said links to take up the slack in the links after the links are connected to both couplers.

2. In transitional coupling mechanism for coupling an automatic car coupler and a coupler of a different type, a plurality of links, one of which is attached to one of the couplers and another of which engages the other of said couplers, a slack adjuster having a sleeve taking about one of the sides of one of the links, said slack adjuster having recesses in its ends into which the ends of adjacent links fit when the slack adjuster is in operative position.

3. In transitional coupling mechanism for coupling together couplers of different types, a plurality of links connecting opposing couplers, a slack adjuster mounted on one of said links and having a rotative engagement therewith, said slack adjuster being arranged, when the couplers are secured together by said links, to be rotated into position between the interlinked ends of two links to take up the slack in the links.

4. In transitional coupling mechanism for coupling together couplers of different types, a plurality of links connecting opposing couplers, and means attached to one of the sides of one of the links for interposition between the said link and an adjacent link interlinked with said link for shortening the effective over all length of the said links.

5. A slack take-up for chain links comprising a block rotatably mounted on one of the links and adapted to be swung into interposed position between the adjacent ends of connected links to shorten the effective length of said links.

6. A slack take up for chain links, comprising in combination with a pair of interlinked links, means attached to one of said links for interposition between said pair of links for decreasing the effective over all length of said links.

JOHN WILLISON.